No. 668,308.  
T. & C. E. FINCH.  
SCOOP FOR CLEANING CESS PITS, &c.  
(Application filed Oct. 26, 1900.)

Patented Feb. 19, 1901.

(No Model.)

UNITED STATES PATENT OFFICE.

THOMAS FINCH AND CHARLES EDWARD FINCH, OF PAEROA-AUCKLAND, NEW ZEALAND.

SCOOP FOR CLEANING CESS-PITS, &c.

SPECIFICATION forming part of Letters Patent No. 668,308, dated February 19, 1901.

Application filed October 26, 1900. Serial No. 34,438. (No model.)

*To all whom it may concern:*

Be it known that we, THOMAS FINCH and CHARLES EDWARD FINCH, subjects of the Queen of Great Britain, residing at Paeroa-Auckland, New Zealand, have invented a new and useful Scoop for Cleaning Cess-Pits and the Like; and we do hereby declare the following to be a full, clear, and exact description of the same.

Our invention relates to scoops adapted for cleaning cess-pits and similar places in which it is necessary to provide a long handle.

The object of the invention is to provide a scoop which will adapt itself to the cess-pit, so that a maximum amount of dirt may be gathered.

The scoop has a narrow bottom and a large open top, with preferably one straight and one curved lip to suit the varying forms of pits, and when lowered to the bottom of the cess-pit the scoop may be tipped so that its side and lip are in contact with the bottom of the cess-pit and thoroughly gather up any dirt when the scoop is moved about as required.

Figure 1:
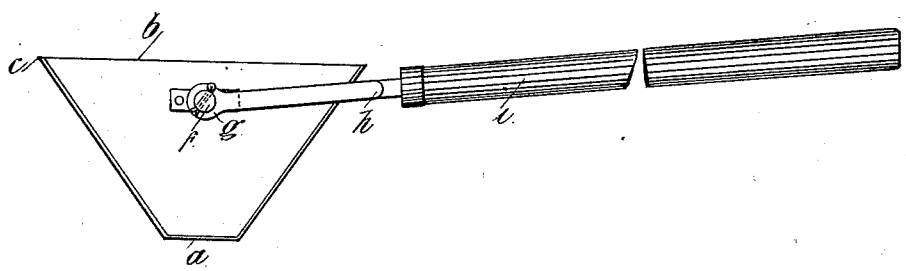
Figure 2:
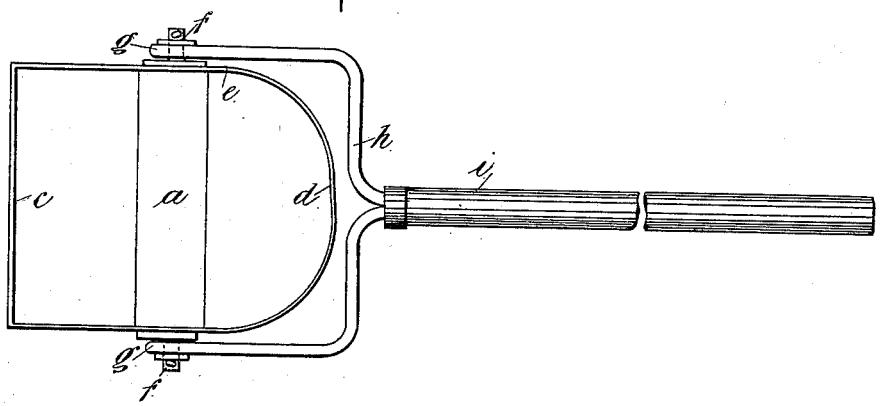

In the drawings, Figure 1 is a side elevation, and Fig. 2 a plan.

The scoop has a narrow bottom $a$ and a large open top $b$, the top being formed with a straight lip $c$ upon one side and a curved lip $d$ upon the other to suit varying forms of pits.

Upon each of the sides $e$ of the scoop is riveted a projecting pivot-pin $f$, said pins fitting into eyes $g$, formed at the end of a fork $h$ in a handle $i$.

In operation when lowered to the bottom of the cess-pit the scoop may be tipped, so that its side and lip are in contact with the bottom of the cess-pit and dirt gathered up which with a fixed scoop it would be almost impossible to get.

The scoop is also useful to gold prospectors for lifting material from below water-level.

What we claim as our invention, and desire to secure by Letters Patent, is—

1. The combination with a handle, of a scoop having a narrow bottom and slanting front side with a straight front end and a fork fixed in the handle pivoted centrally of the scoop near its upper edge, said handle being grasped by the operator in using the scoop.

2. The combination with a handle of a scoop having a narrow bottom and front and rear sides flaring up to an enlarged mouth, the front side being flat and the rear side rounded, and a fork fixed in the handle and pivoted to the scoop.

In testimony whereof we have signed this specification in the presence of two subscribing witnesses.

THOMAS FINCH.
CHARLES EDWARD FINCH.

Witnesses:
   JAMES A. MILLER,
   EDWARD HONISS.